March 25, 1952     C. H. NELSON     2,590,266
HOG WATERER
Filed Dec. 12, 1949
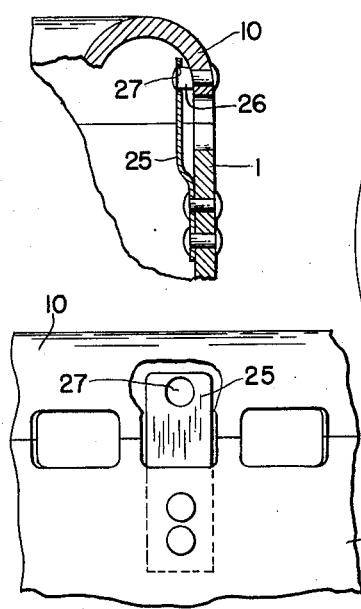
FIG. 4
FIG. 5
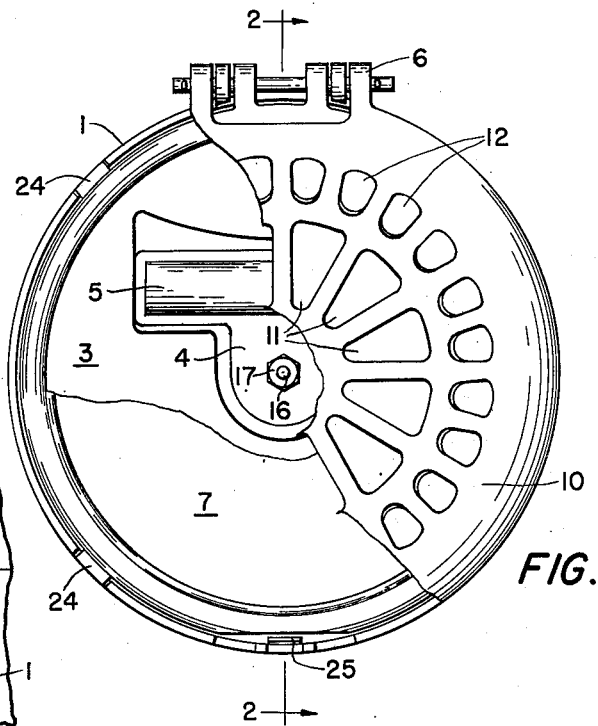
FIG. 1
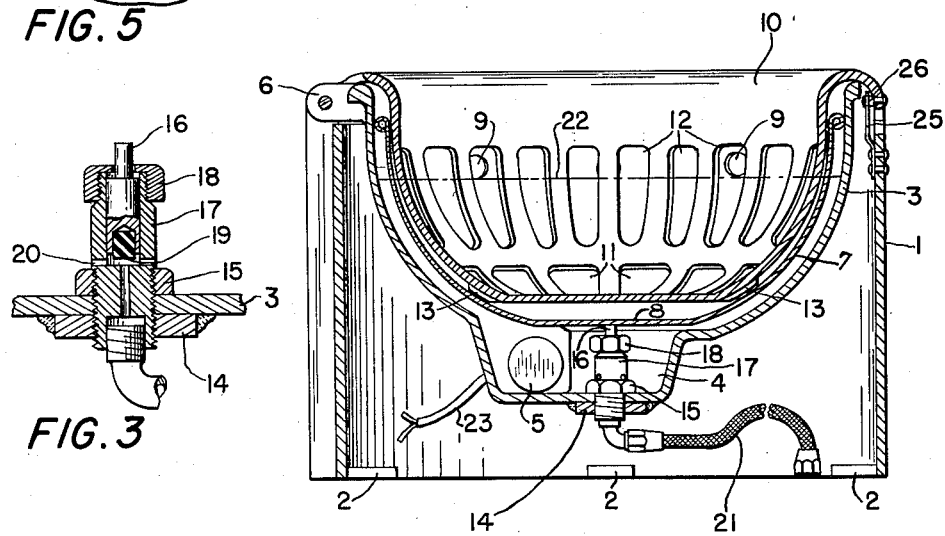
FIG. 3
FIG. 2
Carroll H. Nelson, INVENTOR.
BY Bush & Bush
ATTORNEYS.

Patented Mar. 25, 1952

2,590,266

UNITED STATES PATENT OFFICE 2,590,266

HOG WATERER

Carroll H. Nelson, Cedar Rapids, Iowa

Application December 12, 1949, Serial No. 132,542

6 Claims. (Cl. 119—81)

My invention relates to improvements on watering devices for hogs and other stock, having automatic means for replacing the water in the trough or bowl whenever the water level is reduced below a given point by the animals drinking it and to shut off the flow of water when it has resumed a predetermined level.

The objects of my invention are to provide apparatus of the class described in which means are utilized to prevent contaminated water from entering the supply pipes in case the supply fails; to provide means which will prevent the animals' snouts from shutting off or closing the intake valve; to provide improved means for cleaning the bowl and reservoir of sludge or dirt accumulated therein from the snouts of the animals or otherwise; to provide such an apparatus which is adapted for use with hogs, cattle, poultry, dogs, and other stock; to provide improved, simple means for accomplishing said objects which will act with certainty and may be readily assembled and disassembled.

I accomplish these objects by the means shown in the accompanying drawings, in which, Figure 1 shows a top or plan view with parts broken away;

Figure 2 is a sectional elevation on the line 2—2 of Figure 1;

Figure 3 is an enlarged sectional detail of the valve;

Figures 4 and 5 are enlarged details of the catch or fastening.

My apparatus comprises a housing 1 preferably circular, with feet 2 formed integral therewith. Inside the housing 1 mount a circular bowl-shaped reservoir 3 with a recess 4 formed in the bottom thereof in which an insulated heating coil 5 is mounted.

The reservoir 3 is hinged to one side of the housing 1 by hinge 6. Within the reservoir 3 a removable bowl 7 is mounted, the bottom of which is flattened as at 8 and which has openings 9 formed near the top thereof to take water from the reservoir at a certain height.

Within the bowl 7 and mounted upon the pivot of the hinge 6, I mount a grid 10 preferably formed of a metal casting having a plurality of openings 11 and 12 formed therein and with lugs 13 arranged to contact the flattened part of the bowl 7 and limit its upward movement.

In the recess 4 I mount a valve 17 secured to the bottom of the reservoir by hex nuts 14 and 15 in which a plunger 16 is mounted and secured in place by a nut or sleeve 18 threaded upon the body of the valve 17.

The lower end of the plunger has a facing of rubber 19 designed to rest upon the valve seat and close the valve. Small lateral openings 20 are formed in the body of the valve 17 to permit water to pass from the valve out into the recess 4 of the reservoir and they also act to stir up any sediment in the reservoir and flush it.

A flexible water hose 21 is connected to the lower end of the valve 17 in the usual way and carries water from a suitable supply such as a reservoir or water main, to the reservoir.

The bowl 7 is made of metal somewhat heavier than water and when filled to the water level 22 shown in dotted lines, the weight of the water and bowl combined will cause the bowl to sink and press the plunger 16 down upon the seat of the valve so as to close the intake of water, but when sufficient water has been drunk from the bowl to cause it to float, it will rise, permitting the valve plunger to rise and open the intake, whereby water will flow into the reservoir and when it reaches the height of the openings 9, will flow into the bowl 7 and cause it to again sink and close the intake valve.

The recess 4 has an electric heating coil mounted therein which may be of any desired form and the heating coil is supplied with electricity by flexible wires mounted in the lower part of the housing and connected to a suitable source of electric current.

The reservoir has a plurality of lugs formed upon its upper edge which fit in corresponding notches 24 formed in the upper edge of the housing and prevent rotation of the reservoir.

United to the housing at the upper edge thereof, is a flat spring 25 projecting upwardly a short distance above the housing and having an opening 27 formed near the top thereof.

The grid 10 extends upwardly above the reservoir and the housing and has a peripheral flange which extends downwardly and rests upon the upper edge of the housing.

Corresponding notches are formed in the lower edge of the flange of the grid 10 and the upper edge of the housing 1 to admit air as may be needed in case a gas burner is substituted for the electric heater.

In the flange of the grid 10 adjacent the spring 25, a knob or button 26 is mounted arranged to enter the opening in the spring when the grid is lowered to its lowermost position and which acts as a catch to prevent accidental upward displacement of the grid but which may be readily released by pushing the upper end of the spring inward by insertion of a finger or small rod through the opening formed by the adjacent notch in the upper edge of the housing.

Any suitable form of electric heater may be utilized and I do not claim any particular type except that the heating coil should be enclosed in a waterproof housing as shown.

In the operation of this device, the housing is mounted upon a suitable base or support carrying electric supply wires and a water supply pipe. The flexible wires for the heater are then connected to the electric supply source in the usual way and the flexible hose is coupled to the water supply pipe and to the lower end of the valve by any means in common use.

The reservoir is then seated in the inside of the housing with its lugs resting in corresponding notches in the upper edge of the housing and with its hinge members mounted upon the pivot pin of the hinge.

The bowl is then placed in the reservoir with its flat bottom resting upon the upper end of the plunger. The grid is then inserted in the bowl with its bottom lugs spaced slightly above the flat bottom portion of the bowl and with its hinge members mounted upon the hinge pivot. The flange of the grid then rests upon the upper edge of the housing and the button engages the opening in the spring to lock the grid in position.

The reservoir is then filled with water up to the openings around the top of the bowl. This may be done either from an outside source or by raising the bowl so as to allow the water from the supply line to fill the reservoir. As the reservoir is filled, it will cause the bowl to float, thus allowing the valve to remain open.

The inflow of water from the valve will then raise the water level in the reservoir until it flows through the openings in the bowl and fills the bowl to the desired water level at which time the weight of the bowl and the water within it will cause it to descend, contacting the top of the plunger and closing the valve.

When the water level has been reduced to a predetermined point by the animals drinking the water therefrom, the buoyancy of the bowl with the water thus reduced will cause it to rise thereby again opening the valve and the process will be repeated automatically from time to time.

As hogs and perhaps other animals are likely to carry more or less dirt or sludge upon their snouts which drops off when they are drinking, it is necessary to clean out the bowl at intervals. In order to clean the bowl in my apparatus, it is only necessary to release the catch and raise the grid and reservoir with the bowl between them upon the hinge into vertical position where the contents will immediately flow out and as the flexible hose remains connected during such operation, a sufficient amount of flushing action will be secured by the water continuing to flow through the valve while the grid and reservoir are in this vertical position, to remove accumulations of sediment which may occasionally find its way into the bowl.

After the bowl and reservoir have been emptied, they are swung back into place upon the hinge and the bowl may be manually raised so as to open the valve to refill the reservoir.

Various modifications may be made in the form, proportions and materials of the various parts without departing from the spirit of my invention and I do not limit my claims to the precise forms shown in the drawings.

I claim:

1. A stock waterer, including a housing, a reservoir removably mounted in said housing, a floatable removable bowl or water container mounted in said reservoir and having lateral openings near its upper edge, and a bowl-shaped grid removably seatable in the bowl having a flange extending over the upper edges of the reservoir and bowl, said flange extending downwardly to seat upon the upper edge of the housing and a hinge uniting both the grid and the reservoir to the housing.

2. In a stock waterer, a housing with notches in its upper edge, a reservoir removably mounted in said housing and having lugs united to the upper edge thereof arranged to engage the notches in the housing, a bowl or water container removably mounted in the reservoir, a grid seatable in the bowl having a flange extending over the upper edges of the reservoir and bowl, said flange extending downwardly to seat upon the upper edge of the housing, and hinge connections uniting both the grid and reservoir to the housing whereby the grid and reservoir may be swung upwardly above the housing either separately or together.

3. In a stock waterer as described in claim 2, and an intake valve in series with the reservoir and a water supply pipe, said valve having a plunger arranged to be contacted and actuated by the bowl when the water in the reservoir reaches a predetermined height to close the valve.

4. In a stock waterer as described in claim 2, a flexible water supply pipe, and an intake valve united to the reservoir in series with the reservoir and water supply pipe, said valve having a plunger arranged to be contacted and actuated by the bowl when the water in the reservoir reaches a predetermined height to close the valve and to be released and the valve allowed to be opened by the water pressure in the supply pipe when the water in the bowl falls to a predetermined stage.

5. A stock waterer as described in claim 4, a flexible water supply pipe arranged to permit lifting the reservoir from the housing, and a valve united to the reservoir in series with the reservoir and with the supply pipe arranged to be closed when its stem is depressed by the bowl and opened when not so depressed.

6. A stock waterer as described in claim 4, said water supply pipe having within the housing a section of flexible hose of sufficient length and flexibility to permit the reservoir to be swung upwardly on its hinge to the full height thereof.

CARROLL H. NELSON.

REFERENCES CITED

The following references are of record in the file of this patent:

UNITED STATES PATENTS

| Number | Name | Date |
|---|---|---|
| 1,253,941 | Copeland | Jan. 15, 1918 |
| 1,259,253 | McCullough | Mar. 12, 1918 |
| 2,452,305 | Johnson | Oct. 26, 1948 |
| 2,455,211 | Armstrong | Nov. 30, 1948 |
| 2,479,355 | Hemker | Aug. 16, 1949 |

FOREIGN PATENTS

| Number | Country | Date |
|---|---|---|
| 80,637 | Germany | Apr. 13, 1895 |